Patented Dec. 30, 1930

1,787,065

UNITED STATES PATENT OFFICE

WILLIAM S. CALCOTT AND WILLIAM A. DOUGLASS, OF PENNS GROVE, NEW JERSEY, ASSIGNORS TO E. I. DU PONT DE NEMOURS & COMPANY, OF WILMINGTON, DELAWARE, A CORPORATION OF DELAWARE

METHOD OF RETARDING THE DETERIORATION OF RUBBER

No Drawing.    Application filed September 9, 1929.    Serial No. 391,504.

This invention relates to a method of treating rubber and the resulting rubber product and is more particularly concerned with a method of treatment whereby a rubber product is obtained which is unusually resistant to deterioration.

It is generally accepted that the rate of deterioration of rubber articles differs greatly depending on various factors, such as the composition of the stock, the form of the article, and the conditions under which it is used. Various materials have heretofore been incorporated in rubber stocks to inhibit deterioration.

The primary object of this invention, therefore, is to provide a method for retarding the deterioration of rubber by the use of a new class of compounds, which not only may be easily and economically prepared from readily available materials, but which at the same time do not retard the cure.

With these objects in view it has now been discovered that the diamino and substituted diamino-diaryl-ketones may be added to a rubber mix without materially affecting the rate of cure and that the resulting rubber product when vulcanized has much greater resistance to deterioration than rubber containing no antioxidant.

The products contemplated have the following general formula:

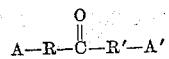

wherein A and A' represent amino groups or alkl substituted or dialkyl substituted amino groups, and R and R' represent aryl radicals. The method for the preparation of such compounds is described in the prior literature and is not a part of the present invention.

In order to disclose the invention in detail, the following example of an actual embodiment thereof is presented. It should be understood, however, that this example is furnished purely for purposes of illustration and that it is not the intention that the invention be limited to the particular reagents, proportions, or other conditions therein specified.

*Example 1: p-p'-tetra-methyl-diamino-diphenyl-ketone*

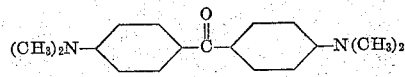

Two stocks were made up of the following composition; the proportions are given by weight:

|  | A | B |
|---|---|---|
| Rubber | 100 | 100 |
| ZnO | 18.15 | 18.15 |
| Sulfur | 2.75 | 2.75 |
| D. O. T. G. | 0.5625 | 0.5625 |
| Antioxidant | 0.0 | 1.0 |

The stocks were cured for 40 minutes at 40 lb. steam pressure and aged in the oxygen bomb at 70° C., under 300 lb. oxygen pressure. Stock A completely deteriorated in 3 days, while stock B was neither blistered nor leathery at the end of the 10th day, and showed only traces of blisters on the 11th day when the test was discontinued.

Obviously many other compounds of the type described may be employed instead of the particular compound, the use of which is illustrated in the example. Among such compounds which possess similar anti-aging properties may be mentioned for purposes of further illustration the following:

(1) 2:2'-diamino-diphenyl-ketone

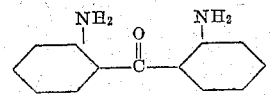

(2) 2:3'-diamino-diphenyl-ketone

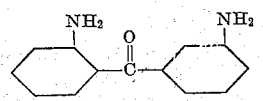

(3) 2:4'-diamino-diphenyl-ketone

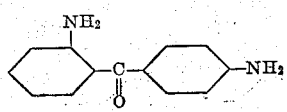

(4) 3:3'-diamino-diphenyl-ketone

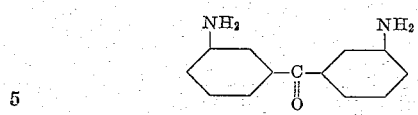

(5) 3:4'-diamino-diphenyl-ketone

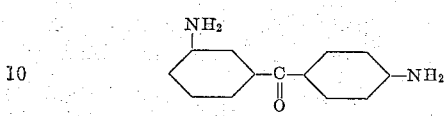

(6) 4:4'-diamino-diphenyl-ketone

(7) 4:4'-methyl-amino-diphenyl-ketone

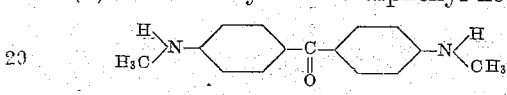

(8) 3:3'-diamino-4:4'-dimethyl-diphenyl-ketone

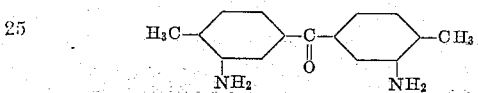

(9) 3:3'-dimethyl-4:4'-diamino-diphenyl-ketone

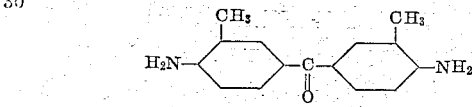

(10) 4 - amino - 4' - dimethyl - amino - diphenyl-ketone

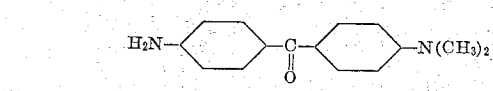

(11) 2:2' - dimethyl - amino-diphenyl-ketone

(12) 3:3' - dimethyl - amino-diphenyl-ketone

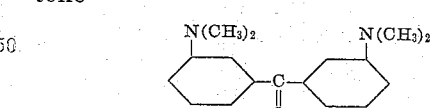

(13) 3:4' - dimethyl - amino-diphenyl-ketone

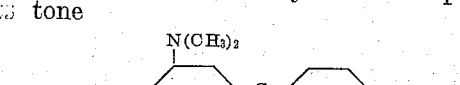

(14) 4:4' - methylamino - 3:3'-methyl-diphenyl-ketone

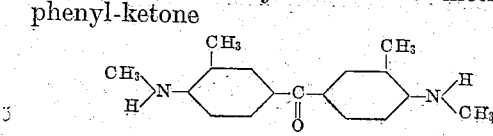

(15) 4 - amino-4'-diethyl-amino-diphenyl-ketone

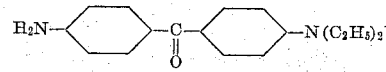

(16) 4:4' - methylamino - 2:2'-methyl-diphenyl-ketone

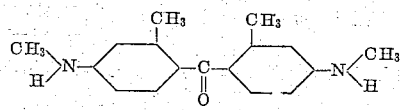

(17) 4-dimethylamino-4'-diethylamino-diphenyl-ketone

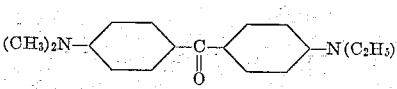

(18) 4:4' - dimethylamino-2:2'-dimethyl-diphenyl-ketone

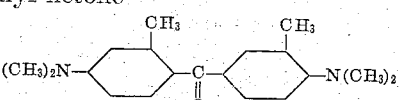

(19) 4:4' - dimethylamino-3:3'-dimethyl-diphenyl-ketone

In addition, compounds resulting from the reaction of p-p'-diamino-diphenyl-ketone and benzyl chloride, ethylene chlorhydrin, or ethylene dichloride have similar anti-aging properties when compounded in rubber. Moreover, it is obvious from the formulas given hereinabove that the invention contemplates compounds in which the aryl groups contain substituents such as alkyl and alkoxy substituents and that such substituents do not materially alter the value of the particular compounds as deterioration inhibitors. Further, it is obvious that corresponding dinaphthyl and phenyl-naphthyl compounds may be employed and exhibit similar properties.

However, of the many compounds which fall within the general class described herein by reason of their unusual effectiveness and their economy of preparation, the tetramethyl-diamino-diaryl-ketones are preferred. Of this preferred class p-p'-tetra-methyl-diamino-diphenyl-ketone represents the preferred embodiment.

The antioxidants described above may be incorporated into the rubber by any well known means, such as by milling them into the stock upon the rolls of an ordinary mill. Moreover, they can be employed in various rubber compounds and rubber substitutes, such as, for example, gutta percha, balata, and synthetic rubber, and it is therefore to be understood that the invention is not limited to any particular rubber stock or rubber compound.

Also, the proportion of the antioxidant employed may be varied within wide limits depending upon the stock treated and the conditions to be met in use. Under ordinary circumstances from 1 to 5% of the compound based on the weight of the rubber has been found to be highly satisfactory.

While we prefer to use the antioxidants of this type by adding the antioxidant to the rubber mix prior to vulcanization, it is also possible to use them for the treatment of vulcanized rubber. In such cases the rubber may be impregnated by either dissolving the antioxidant in a solvent, or by employing it in vapor form.

As many apparent and widely different embodiments of this invention may be made without departing from the spirit thereof, it is to be understood that we do not limit ourselves to the foregoing examples or description except as indicated in the following claims.

We claim:

1. The process of increasing the resistance of rubber to deterioration which comprises incorporating with the rubber a compound having the following general formula

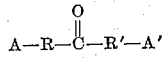

wherein each of A and A' represents an amino group or a mono- or dialkyl amino group, and R and R' represent aryl nuclei.

2. The process of increasing the resistance of rubber to deterioration which comprises incorporating with the rubber p-p'-tetra-methyl-diamino-diphenyl-ketone.

3. In the art of vulcanizing rubber, the step of mixing with the unvulcanized rubber a vulcanizing agent and a compound having the general formula

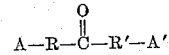

wherein each of A and A' represents an amino group or a mono- or dialkyl amino group, and R and R' represent aryl nuclei, and thereafter vulcanizing.

4. In the art of vulcanizing rubber, the step of mixing with the unvulcanized rubber a vulcanizing agent and a compound of the type set forth in claim 1, in which formula at least one of A and A' represents an alkyl substituted amino group, and thereafter vulcanizing.

5. In the art of vulcanizing rubber, the step of mixing with the unvulcanized rubber a vulcanizing agent and a compound of the type set forth in claim 1, in which formula at least one of A and A' represents a dialkyl substituted amino group, and thereafter vulcanizing.

6. In the art of vulcanizing rubber, the step of mixing with the unvulcanized rubber a vulcanizing agent and a compound of the type set forth in claim 1, in which formula both A and A' represent an alkyl substituted amino group, and thereafter vulcanizing.

7. In the art of vulcanizing rubber, the step of mixing with the unvulcanized rubber a vulcanizing agent and a compound of the type set forth in claim 1, in which formula both A and A' represent a dialkyl substituted amino group, and thereafter vulcanizing.

8. In the art of vulcanizing rubber, the step of mixing with the unvulcanized rubber a vulcanizing agent and a compound of the type set forth in claim 1, in which formula both R and R' represent phenyl radicals, and thereafter vulcanizing.

9. In the art of vulcanizing rubber, the step of mixing with the unvulcanized rubber a vulcanizing agent and a compound of the type set forth in claim 1, in which formula both A and A' represent an alkyl substituted amino group, and both R and R' represent phenyl nuclei, and thereafter vulcanizing.

10. In the art of vulcanizing rubber, the step of mixing with the unvulcanized rubber a vulcanizing agent and p-p'-tetra-methyl-diamino-diphenyl-ketone, and thereafter vulcanizing.

11. Rubber having incorporated therewith an anti-aging compound having the general formula

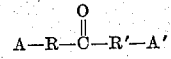

wherein each of A and A' represents an amino group or a mono- or dialkyl amino group, and R and R' represent aryl nuclei.

12. Rubber having incorporated therewith p-p'-tetra-methyl-diamino-diphenyl-ketone, and thereafter vulcanizing.

13. Vulcanized rubber obtained by incorporating with the rubber prior to vulcanization a vulcanizing agent and an anti-aging compound having the general formula

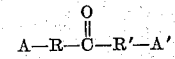

wherein both A and A' represent a dialkyl substituted amino group, and R and R' both represent phenyl nuclei, and thereafter vulcanizing.

14. Vulcanized rubber obtainable by incorporating with the rubber prior to vulcanization a vulcanizing agent and from 1 to 5% of p-p'-tetra-methyl-diamino-diphenyl-ketone.

15. In the art of vulcanizing rubber the step of mixing with the unvulcanized rubber a vulcanizing agent and 4-4'-diamino-diphenyl-ketone, and thereafter vulcanizing.

16. In the art of vulcanizing rubber the step of mixing with the unvulcanized rubber a vulcanizing agent and 4-4'-methyl-amino-diphenyl-ketone.

17. Vulcanized rubber obtainable by incorporating with the rubber prior to vulcanization a vulcanizing agent and from 1 to 5% of 4-4'-diamino-diphenyl-ketone.

18. Vulcanized rubber obtainable by incorporating with the rubber prior to vulcanization a vulcanizing agent and from 1 to 5% of 4-4'-methyl-amino-diphenyl-ketone.

In testimony whereof we affix our signatures.

WILLIAM S. CALCOTT.
WILLIAM A. DOUGLASS.